July 6, 1971
C. E. ADAMS ET AL
3,591,489
TWO-STAGE DESULFURIZATION UTILIZING HYDROGEN
IN THE SECOND STAGE REACTION
Filed Jan. 24, 1969
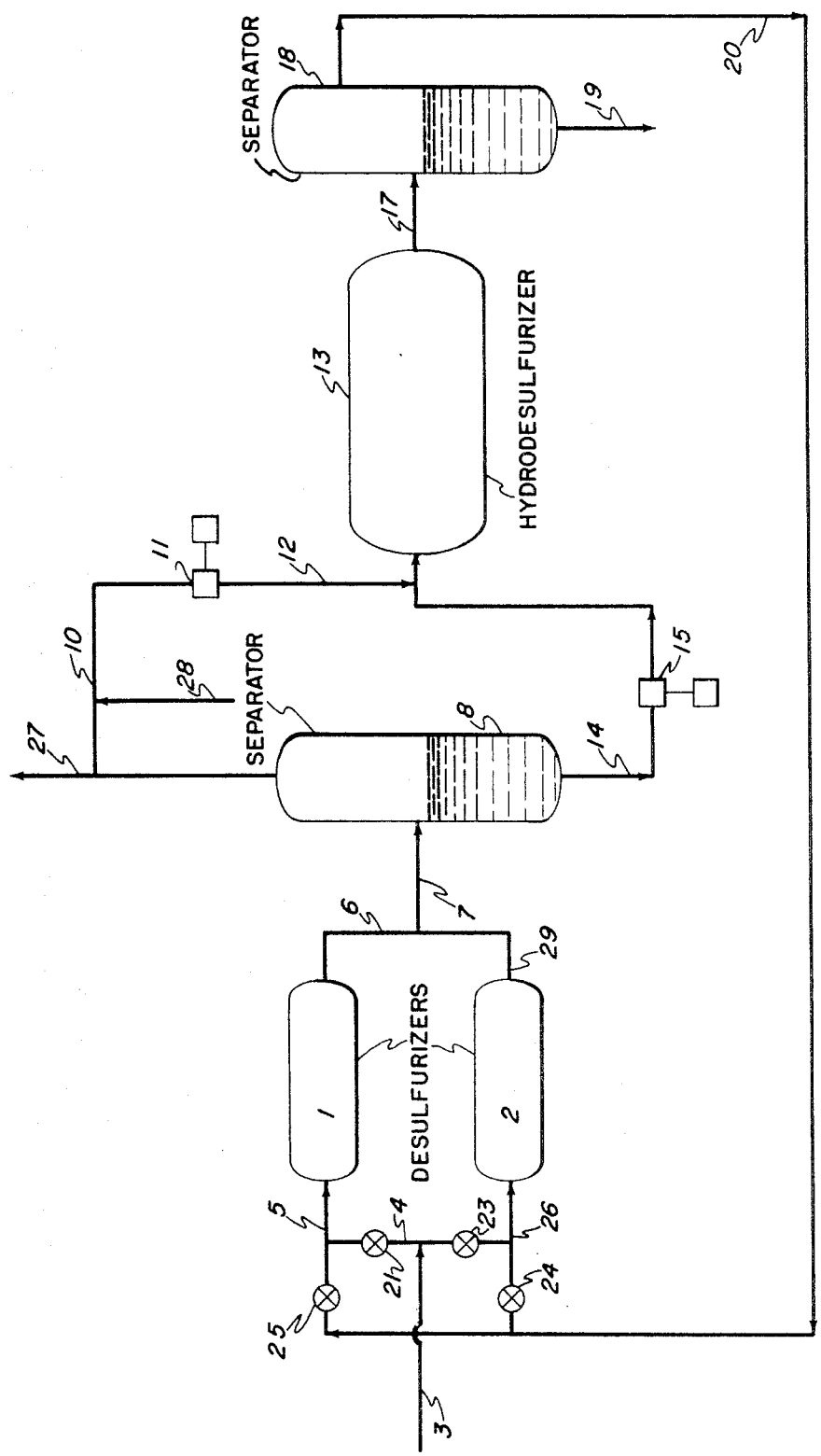
C. E. Adams
C. N. Kimberlin, Jr.
Inventors
By  Attorney 
United States Patent Office 3,591,489
Patented July 6, 1971

3,591,489
TWO-STAGE DESULFURIZATION UTILIZING HYDROGEN IN THE SECOND STAGE REACTION
Clark E. Adams and Charles N. Kimberlin, Jr., Baton Rouge, La., assignors to Esso Research and Engineering Company
Filed Jan. 24, 1969, Ser. No. 793,784
Int. Cl. C10g 23/02
U.S. Cl. 208—211                            3 Claims

ABSTRACT OF THE DISCLOSURE

Petroleum fractions boiling above 200° F. are desulfurized in two stages in the presence of a sulfur-resistant catalyst, the first stage being carried out in the absence of hydrogen and the second in the presence of hydrogen. The catalyst deactivates rapidly in the first stage and is regenerated by stripping with hydrogen or mixtures of hydrogen and hydrogen sulfide.

BACKGROUND OF THE INVENTION

This invention relates to the treatment of sulfur-containing organic materials, in particular, sulfur-bearing hydrocarbon material, to desulfurize the same.

The problem of sulfur removal from petroleum fractions and crudes is as old as the petroleum industry. For most purposes it is undesirable to have an appreciable amount of sulfur in any petroleum product. Sulfur is particularly objectionable in fuel oils of any kind because it burns to form $SO_2$ which is obnoxious and corrosive.

Sulfur occurs in petroleum stocks generally in two main forms, as mercaptans and as part of a more or less substituted ring, of which thiophene is the prototype. Sulfur removal from the lighter fractions does not present the problems it does with the heavier stocks where the ring structures are mostly found. This type of sulfur is not susceptible to the chemical operations satisfactory with mercaptan sulfur but requires more drastic treatment such as hydrogenation in the presence of sulfur-resistant catalysts, e.g., cobalt molybdate, tungsten sulfide, molybdenum sulfide, etc. while such a process has attained a measure of success it does consume a large amount of hydrogen which increases the costs of the process.

SUMMARY OF THE INVENTION

The present invention affords a means for reducing the amount of hydrogen needed to desulfurize petroleum stocks containing large quantities of heterocyclic sulfur compounds.

In accordance with this invention this is accomplished by providing a two stage process in which the oil is contacted with the catalyst in a first stage in the absence of hydrogen wherein the more easily removable sulfur compounds are converted into hydrogen sulfide followed by a second stage in which the oil is passed over the catalyst in the presence of hydrogen.

It has also been found that the catalyst in the first stage can easily be regenerated by passing hydrogen or a mixture of hydrogen and hydrogen sulfide over it under substantially reaction conditions but in the absence of the feed. This can be conveniently accomplished by providing two or more first stage reactors, one of which is on stream while the others are being regenerated, the regeneration being accomplished by recycling hydrogen or a mixture of hydrogen and hydrogen sulfide over the catalyst in the reactor not on stream.

BRIEF DESCRIPTION OF THE DRAWING

The drawing is a diagrammatic representation of one suitable type of flow plan showing how the present invention can be carried out.

DESCRIPTION OF THE PREFERRED EMBODIMENTS

Referring now to the drawing, numerals 1 and 2 represent two or more reactors containing a catalyst which is active for the desulfurization of oil in the absence of hydrogen or other diluent.

Suitable catalysts are a Group VI-B compound, specifically a molybdenum compound or a tungsten compound, such as the oxide or sulfide and mixtures of these together with a Group VIII compound, specifically a nickel or cobalt compound, such as the oxide or sulfide. The preferred metal compounds are nickel oxide with molybdenum oxide or cobalt oxide with molybdenum oxide, used in the following proportions: 1 to 15 wt. percent, preferably 2 to 10 wt. percent, of nickel or cobalt oxide, 5–25, preferably 10–20 wt. percent of tungsten or molybdenum oxide on a suitable support, such as alumina or alumina containing small amounts of silica. A particularly suitable support is alumina containing 1 to 6 wt. percent silica wherein the surface area of the catalyst support in pores having a diameter of 30 to 70 A. is at least 100 square meters per gram, preferably 100–300 square meters per gram. All of these catalysts are preferably used in the sulfided form.

Reactors 1 and 2 operate in parallel with one of the reactors at all times being used for desulfurization while the remainder are undergoing regeneration. In the present description reactor 1 will be considered as in desulfurization service while reactor 2 is undergoing regeneration.

Oil feed is introduced to reactor 1 through lines 3, 4 and 5 where it is subjected to partial desulfurization at temperatures of 600 to 800° F.; preferably 650 to 750° F., at a feed rate of about 0.1–5 volumes of feed per volume of catalyst per hour (v./v./hr.), preferably 0.2–1.0 v./v./hr. and at a sufficient pressure to maintain the oil in the liquid phase. The feedstock may be any oil boiling above 200° F., but is preferably one boiling above about 400° F. Residual boiling above about 1050° F. may also be used Partially desulfurized oil is removed from reactor 1 through lines 6 and 7 and is introduced into separator 8. Here the partially desulfurized oil is separated from any hydrogen sulfide formed during the desulfurization in reactor 1. Gaseous products, including hydrogen sulfide leave separator 8 through line 9 and are passed by line 10, compressor 11 and line 12 to hydrodesulfurization reactor 13. Liquid product is removed from separator 8 through line 14, and passed by pump 15 and line 16 to reactor 13.

Reactor 13 may contain any type of sulfur resistant catalyst suitable for desulfurization in the presence of hydrogen but preferably contains the preferred catalyst used in rectors 1 and 2. Reactor 13 operates under normal hydrodesulfurization conditions which are typically 500–

850 F., preferably 650–800° F., 500–2500 p.s.i.g., preferably 1000–1800, a space velocity of 0.1 to 10.0 v./v./hr. preferably 0.5–5, and a hydrogen rate of 500–10,000 standard cubic feet per barrel (s.c.f./b.), preferably 1000–5000.

The desulfurized oil is removed from reactor 13 by line 17 and introduced into separator 18 from which desulfurized oil is removed through line 19. Hydrogen and hydrogen sulfide are removed from separator 18 through line 20.

A particular feature of this invention is the regeneration of the catalyst by the use of hydrogen or mixtures of hydrogen and hydrogen sulfide. The activity of the catalyst used in reactors 1 and 2 declines rapidly so that at the end of about 48 hours the degree of desulfurization has decreased to about one-half its original value. This catalyst can be efficiently regenerated by recycling the mixture of hydrogen and hydrogen sulfide flowing in line 20 to the reactor containing the catalyst to be regenerated, which in the case being described, is reactor 2. When this reactor goes off stream and is placed on regeneration, valve 21 is opened and valve 23 is closed to allow fresh feed to enter reactor 1 and valve 24 is opened and valve 25 closed to allow recycle hydrogen and hydrogen sulfide to enter reactor 2 through line 26. Part of the recycle hydrogen and hydrogen sulfide may be purged by line 27 and make-up hydrogen may be added through line 28.

Reactor 2, when on regeneration is maintained at a temperature of 650° F. and higher and at pressures above about 200 p.s.i.g. Spent gases from this reactor are removed through line 29 and passed into separator 6 along with the desulfurized oil from reactor 1. The switching of flow from reactor 1 to reactor 2 and back again may occur as often as each hour or as infrequently as each week but is preferably accomplished after about 6 to 24 hours.

In accordance with the process just described about 25–85% of the sulfur is removed in either reactor 1 or 2 depending upon the type of feedstock used, the higher boiling stocks being most difficult to desulfurize.

As an example of the improved results obtained by this invention, a series of runs were made in which a Safaniya gas oil containing about 3.1% sulfur was passed over a catalyst consisting of 3.5 weight percent CoO, 12.5 weight percent $MoO_3$ on an alumina support containing 2.0 weight percent $SiO_2$ and having a surface area of 266 square meters per gram, a pore volume of 0.50 cc. per gram, and a surface area in 30–70 A. diameter pores of 174 grams per square meter, at a temperature of 700° F., at a space velocity of 0.25 volume of feed per volume of catalyst under different pressures and for different lengths of time, and the percent removal of sulfur was determined. At the conclusion of the specified time, the feed was shut off and the catalyst was regenerated with $H_2$, hydrogen containing 10% $H_2S$ or nitrogen for various periods of time under the same conditions of temperature, feed rate and pressure after which the feed was again cut in and the desulfurization continued for a period equal to that of the original. This shifting between desulfurization and regeneration was continued for up to nine periods of on-stream operation. Similar runs were also made on a nickel-tungsten catalyst containing 5 weight percent NiO and 24 weight percent $WO_3$ on the same support as used with the cobalt-molybdenum catalyst. The following results were obtained:

| Pressure, p.s.i.g. | Strip Gas | Hrs. | Run, hrs. | Cat. | Percent removal of sulfur for period | | | | | | | | |
|---|---|---|---|---|---|---|---|---|---|---|---|---|---|
| | | | | | 1 | 2 | 3 | 4 | 5 | 6 | 7 | 8 | 9 |
| 800 | 10% $H_2S/H_2$ | 6 | 18 | Co-Mo | [1]43 | 48 | 43 | 45 | [1]39 | 43 | 49 | | |
| 800 | 10% $H_2S/H_2$ | 18 | 6 | Ni-W | 53 | 68 | 75 | 73 | 75 | 76 | 75 | 74 | 69.4 |
| 800 | 10% $H_2S/H_2$ | 18 | 6 | Co-Mo | 64 | 71 | 72 | 71 | 73 | 74 | 72 | 69 | 75.0 |
| 800 | 10% $H_2S/H_2$ | 18 | [2]6(×2) | Co-Mo | 47 | 46 | 54 | | | | | | |
| 0 | 10% $H_2S/H_2$ | 18 | 6 | Co-Mo | | | | 35 | 29 | | | | |
| 800 | $H_2$ | 18 | 6 | Co-Mo | 52 | 73 | 73 | | | | | | |
| | 10% $H_2S/H_2$ | 18 | 6 | Co-Mo | | | | 66 | 68 | | | | |
| 800 | $N_2$ | 18 | 6 | Co-Mo | 71 | 36 | 22 | | | | | | |
| | 10% $H_2S/H_2$ | 18 | 6 | Co-Mo | | | | 38 | 52 | | | | |
| 500 | 10% $H_2S/H_2$ | 2 | 6 | Co-Mo | 68 | 69 | 66 | 63 | 64 | | | | |
| | $H_2$ | 2 | 6 | Co-Mo | | | | | | 68 | 66 | | |

[1] 18 hr. period after 6 hr. period.
[2] Double the feed rate.

The above data show that a large part of the sulfur can be removed from the hydrocarbon feed simply by passing the feed over the catalyst in the absence of hydrogen and that the activity of the catalyst can be restored by stripping with hydrogen or mixtures of hydrogen and hydrogen sulfide.

This partially desulfurized hydrocarbon feed can be subsequently desulfurized over similar catalyst in the presence of hydrogen to complete the desulfurization with the use of less hydrogen than would have been required if all the sulfur were removed with hydrogen.

The nature of the present invention having thus been fully set forth and illustrated and specific examples of the same given what is claimed as new, useful and unobvious and desired to be secured by Letters Patent is:

1. A method for desulfurizing a hydrocarbon oil boiling above about 200° F. which comprises contacting the oil in a first stage with a sulfur resistant catalyst comprising (a) 1 to 15 weight percent of nickel sulfide or cobalt sulfide and (b) 5 to 25 weight percent of tungsten sulfide or molybdenum sulfide, on an alumina support containing 1 to 6 weight percent silica, in the absence of hydrogen, in the liquid phase, at a temperature of from 650 to 800° F. at a feed rate of 0.1 to 1 volume of feed per volume of catalyst per hour (v./v./hr.), to form a partially desulfurized oil; and then contacting the partially desulfurized oil in a second stage with said sulfur resistant catalyst as used in the first stage, in the presence of hydrogen, at a temperature of from 500° to 850° F., a pressure between 500 to 2500 p.s.i.g., a feed space velocity of between 0.1 and 10 v./v./hr., and a hydrogen rate of between 500 to 10,000 s.c.f./b., to form a substantially completely desulfurized oil.

2. The process of claim 1 in which the catalyst support has a surface area in pores of 30 to 70 A. diameter of at least 100 square meters per gram.

3. The method for desulfurizing a hydrocarbon oil boiling above about 200° F. which comprises contacting the oil in the liquid phase in a first stage consisting of a plurality of reaction zones, only one of which is on stream and the remainder of which are being regenerated, the contacting being carried out in the absence of hydrogen with a catalyst consisting of 1 to 15 weight percent of nickel sulfide or cobalt sulfide and 5 to 25 weight percent of tungsten sulfide or molybdenum sulfide on an alumina support containing about 1 to 6 weight percent silica, said support having a surface area, in pores of 30 to 70 A. diameter, greater than 100 square meters per gram, said contacting being carried out at a temperature of between 650 and 800° F. with a feed rate of between 0.1 and 1 volume of feed per volume of catalyst per hour, whereby a partially desulfurized oil is obtained, then contacting the partially desulfurized oil in a second stage in the presence of hydrogen and a catalyst having the same composition as that used in the first stage, at a temperature between 500 and 850° F., a pressure between 500 and 2500 p.s.i.g., a feed rate between 0.1 and 10 volumes of feed per volume of catalyst per hour, and a hydrogen flow rate between 500 and 10,000 standard cubic feet per barrel whereby a substantially completely desulfurized oil is obtained, separating a mixture of hydrogen and hydrogen sulfide from said completely desulfurized oil and recycling said mixture to said reactors undergoing regeneration and stripping the spent catalyst in said reactors undergoing regeneration with said mixture at a temperature above about 650° F. and pressures above about 200 p.s.i.g. until said catalyst is regenerated.

References Cited
UNITED STATES PATENTS

| | | | |
|---|---|---|---|
| 2,300,877 | 11/1942 | Drennan | 208—244 |
| 2,301,802 | 11/1942 | Burk et al. | 208—243 |
| 2,337,358 | 12/1943 | Szayna | 208—244 |
| 3,116,234 | 12/1963 | Douwes et al. | 208—208 |
| 3,340,180 | 9/1967 | Beuther et al. | 208—216 |
| 3,341,448 | 9/1967 | Ford et al. | 208—211 |

DELBERT E. GANTZ, Primary Examiner

G. J. CRASANAKIS, Assistant Examiner